Dec. 26, 1939.  C. C. LOOMIS  2,184,389
TRAP RELEASE
Filed Jan. 26, 1937  2 Sheets-Sheet 1

INVENTOR.

CRAWFORD C. LOOMIS

*ATTORNEY*

Dec. 26, 1939.    C. C. LOOMIS    2,184,389
TRAP RELEASE
Filed Jan. 26, 1937    2 Sheets-Sheet 2
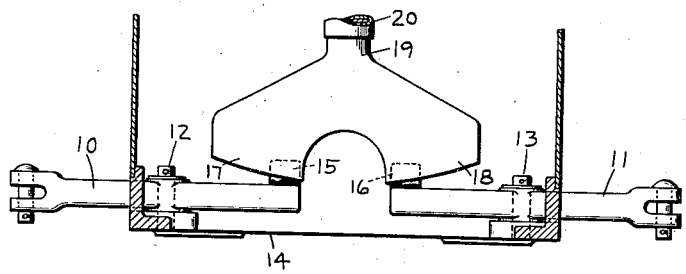
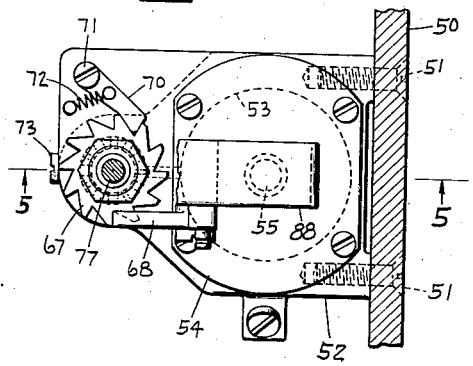
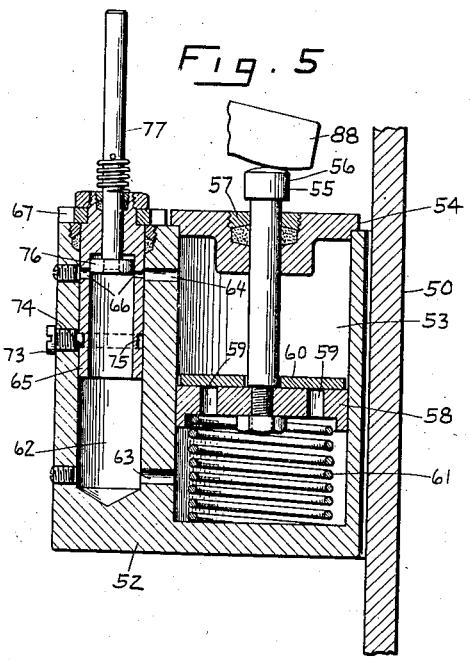
INVENTOR.
CRAWFORD C. LOOMIS
ATTORNEY Patented Dec. 26, 1939

2,184,389

UNITED STATES PATENT OFFICE 2,184,389

TRAP RELEASE

Crawford C. Loomis, Ilion, N. Y., assignor to Remington Arms Company, Inc., a corporation of Delaware Application January 26, 1937, Serial No. 122,343

14 Claims. (Cl. 124—33)

This invention relates to a device for the release of target throwing traps, and contemplates an improved and simplified mechanism whereby one or more traps may be released either instantaneously or after a lapse of an unknown time interval subsequent to manipulation of the releasing mechanism.

The development and increasing efficiency of shooters in the sport of skeet has given rise to a demand for devices for rendering this sport somewhat more difficult. Ordinarily one or more targets are thrown immediately upon an indication by the shooter that he is in readiness to fire. To render the sport somewhat more difficult it is desirable to provide means whereby a delay of an unknown interval up to about three seconds may be provided after the shooter indicates his readiness and manipulation of the trap releasing devices by the puller. A number of appliances for this purpose have been proposed in conjunction with electric releases. They usually depend for their functioning upon the closing of an electrical circuit by a rotating element, the variable time interval being furnished by the timing of the manual closing of a circuit with respect to such a constantly rotating element. These appliances are undesirably complicated, and not altogether reliable in service. They are subject to the further disadvantage that many skeet fields are not provided with electric current, and it is necessary to make installations of current supplying batteries every time the field is used.

It is an object of the present invention to provide a variable timer for the release of target throwing traps which is entirely mechanical and self-contained and which may be permanently installed on a skeet or other target throwing field and remain in place in all conditions of weather without damage or injury.

It is a further object of this invention to control the release of one or more traps by a hydraulic device provided with suitable appliances varying the time interval between manipulation by the operator and actual movement of the trap releasing element by varying the time in which a hydraulically moved or controlled part reaches a final trap releasing position.

In the drawings:

Fig. 3 is a fragmentary transverse vertical section substantially on the line 3—3 of Fig. 1.

Fig. 4 is a fragmentary horizontal section substantially on the line 4—4 of Fig. 1.

Fig. 5 is a fragmentary longitudinal section showing details of the variable time hydraulic mechanism.

Fig. 6 is a development of the cylindrical variable orifice valve.

Figure 1:
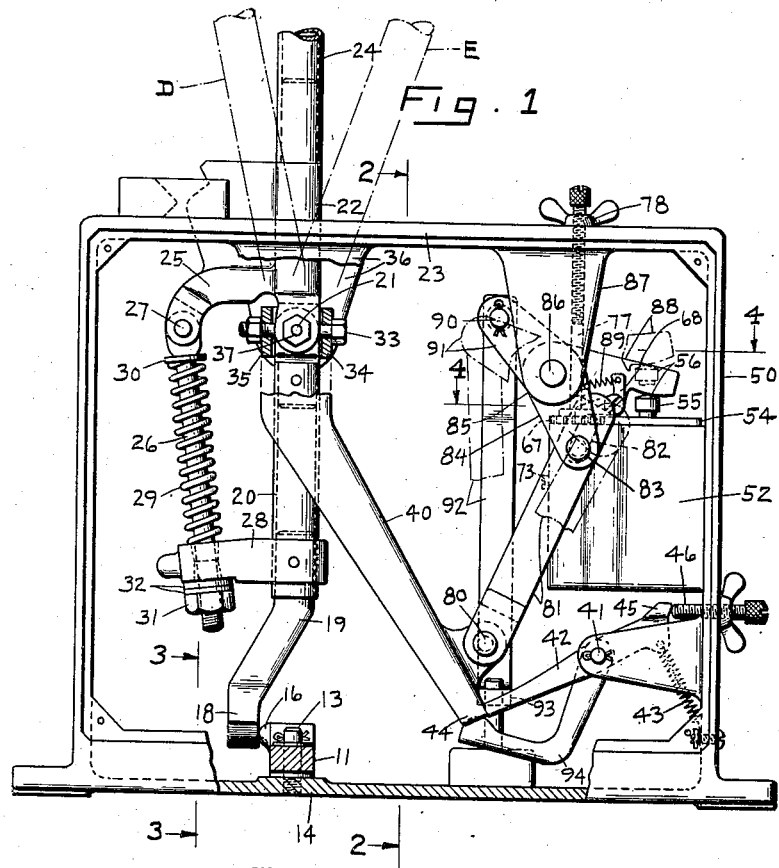
Fig. 1 is a side elevation of a trap releasing mechanism embodying one form of the present invention, one side of the case having been removed to expose the mechanism, and certain parts being shown in section.
Figure 2:
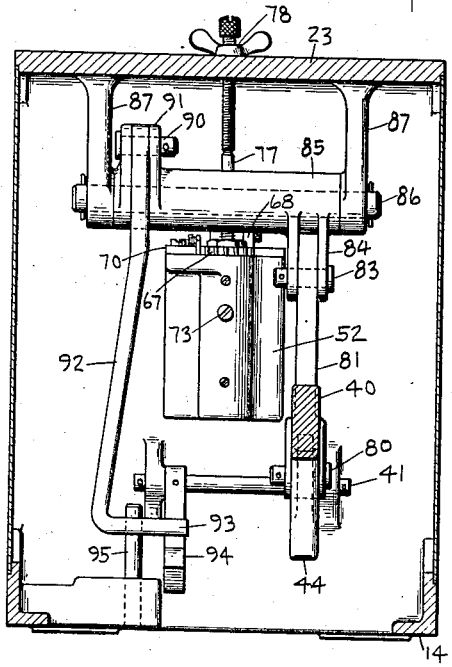
Fig. 2 is a transverse vertical section substantially on the line 2—2 of Fig. 1.

The mechanism as illustrated contemplates the individual or simultaneous release of two target traps, the release mechanism on the traps being connected through a wire or other suitable means with the outwardly projecting ends of levers 10 and 11 respectively, said levers being pivoted at 12 and 13 respectively in the base 14. The inner ends of levers 10 and 11 are provided with upstanding lugs 15 and 16 respectively which are in the path of movement of the two prongs 17 and 18 of a forked lever 19. This lever is illustrated in full lines in Fig. 3 in position to operate both of the levers 10 and 11 and thereby effect simultaneous release of both traps. It will be apparent that if the lever is swung laterally in either direction from the position illustrated in Fig. 3 to bring the gap between the prongs 17 and 18 opposite either of the lugs 15 or 16 one trap only will be released. The forked lever 19 is preferably a casting which as illustrated is received in a sleeve 20, the upper end of said sleeve being pivotally joined at 21 to a lever 22 which projects upwardly through an aperture in the top 23 of the frame or housing. An operating handle 24 is releasably joined to the lever 22. Preferably the handle 24 is a tube which slides over the upwardly projecting end of lever 22, the purpose of this construction being to enable the ready removal of the operating handle and the complete closing of the mechanism case when the device is not in use. Lever 22 is further joined to sleeve 20 by means of an arm 25 projecting rearwardly from lever 22 and a link 26 pivoted at 27 to arm 25 and passing loosely through an aperture in an arm 28 secured to the sleeve 20. A spring 29 is interposed between a collar 30 on link 26 and the upper surface of arm 28, and the lower extremity of link 26 is threaded to receive a nut 31. Preferably one or more fiber washers 32 are interposed between nut 31 and the undersurface of arm 28. It will be apparent that this construction enables the lever 22 to swing to the left (Fig. 1) while sleeve 20 and lever 19 remain stationary, the spring 29 being compressed in this operation; but that, spring 29 being fully extended, lever 22 cannot be moved to the right independently of lever 19. The upper end of sleeve 20 is supported on a longitudinally extending pivot 33 held between arms 34 and 35 of a yoke which is pivoted in brackets 36 depending from the top 23 of the frame. This construction obviously provides for the following movements of the movable parts thus far described. First: Movement of the handle 24 and lever 22 to the right or left to select for operation either the trap controlled by lever 10 or the trap controlled by lever 11. Upon such movement of the handle, the lever assembly, including handle 24, stub lever 22, sleeve 20 and lever 19, rocks about the longitudinal pivot 33. Second: Movement of the lever assembly clockwise (Fig. 1) about pivot 37. This movement is for a purpose to be hereinafter described. Third: Movement of the lever assembly counterclockwise (Fig. 1) about pivot 37 to effect the release of one or both traps through the engagement of prongs 17 and/or 18 with lugs 15 and/or 16. Fourth: Movement of operating handle 24 and stub lever 22 counterclockwise about the pivot 21 without movement of lever 19, the spring 29 being compressed. This movement is incidental to securing a delayed release in the manner to be hereinafter described, and takes place only when movement of lever 19 is restrained. The means for thus restraining movement of lever 19 is as follows:

Secured to the yoke 34—35 is a downwardly and forwardly extending lever 40. Secured to an arbor 41 suitably supported in the frame is a latch lever 42 which is urged by a spring 43 into position in which its end 44 is in the patch of movement of the lower end of lever 40. Movement of latch 42 by its spring 43 is stopped by the engagement of a shoulder 45 on said latch of an abutment 46 which is preferably made adjustable, as illustrated, to provide a variable surface of contact of the face 44 of the latch with the end portion of lever 40. Movement of latch 42 to release the lever 40 and thereby permit trap releasing movement of the lever 19 is controlled by a hydraulic mechanism which may take various forms. The particular embodiment of this mechanism selected for the purpose of illustration may be described as follows:

Secured to the frame plate 50 by suitable means, such as screws 51, is a cylinder and valve containing block 52. This block is bored from the top to form a cylinder 53 which is closed at the bottom by the block itself and at the top by a cylinder head 54 which is apertured to receive piston rod 55 which is preferably provided with an enlarged head 56. A suitable packing gland 57 may be provided to prevent the escape of oil about the piston rod 55. To the lower end of piston rod 55 is secured a piston 58 equipped with a suitable check valve which may comprise apertures 59 through the piston and a plate 60 overlying said apertures. The piston is urged upwardly by suitable means such as a spring 61 interposed between the underside of the piston and the bottom of the cylinder. The part of the cylinder 53 below the piston is in communication with a valve chest 62 through a port 63, and the part of the cylinder 53 above the piston 58 is in communication with the valve chest through a port 64. Valve chest 62 contains a sleeve valve 65, and in the periphery of sleeve 65 at the level of port 64 are a number of ports or apertures 66 of varying sizes. A typical arrangement of these ports is illustrated in Fig. 6, in which their heterogeneous arrangement will be noted. The time of flow of the oil or other fluid from the space in cylinder 53 above piston 58 through the valve chest to the space in the cylinder below the piston is governed by the size of the particular port 66 which stands opposite the port 64, and the time interval between manipulation of the handle 24 and movement of levers 40 and 19 to effect trap release is governed by the rise of piston 58 in a manner to be presently described.

Means are provided for rotating sleeve valve 65 an amount equal to the spacing of the ports 66 on each operation of the mechanism. This means may comprise a ratchet 67 secured to the upper end of sleeve valve 65 and adapted for engagement by an actuating pawl 68. To prevent retrograde movement of the sleeve valve, a retaining pawl 70 is pivoted at 71 on the top of the cylinder block 52 and urged into engagement with ratchet 67 by suitable means such as a spring 72. The sleeve valve 65 is held in correct vertical position by suitable means such as a screw 73 provided with a cylindrical boss 74 adapted to enter a recess 75 in the periphery of the sleeve valve.

A further variation in timing may be secured by closing off a portion of all of the sleeve valve ports 66. For this purpose a piston 76 may be placed within the sleeve and connected with a piston rod 77 extending upwardly to an adjusting nut 78 disposed above the top frame plate 23. By manipulation of the rod 77 through nut 78 the piston 76 may be raised or lowered to close off less or more of the entire series of ports 66.

To enable the hydraulic mechanism just described to control the lever 42 to permit movement of lever 40, suitable means are provided, one form of which may be constructed as follows:

Pivoted to lever 40 at 80 is a link 81 having in its upper end an elongated slot 82 which receives a pin 83 projecting from an arm 84 secured to a sleeve 85 rotatably held on an arbor 86 supported in brackets 87 depending from the top frame plate 23. Likewise secured to sleeve 85 is a lever 88, the free end of which overlies the head 56 on piston rod 55. Pawl 68, which, as heretofore described, actuates the ratchet 67 to rotate the sleeve valve 65, is pivoted on lever 88 and urged into engagement with the ratchet by a suitable spring such as 89. Pivoted at 90 to an arm 91 secured to sleeve 85 is a link 92 provided with a transversely extending foot 93 overlying an arm 94 secured to the arbor 41 which, as heretofore described, likewise carries the lever 42. Link 92 is guided for vertical movement by suitable means which may comprise a stud 95 secured in the base 14 and extending through an aperture in the foot 93.

The operation of the devices may be described as follows:

The pull lever or handle 24 normally stands in the upright central position illustrated in Fig. 1, and piston 58 is normally elevated due to the upward pressure of spring 61. Due to its engagement by the piston rod head 56, lever 88, and with it the entire assembly on sleeve 85, is rotated counterclockwise to the positions illustrated in broken lines in Fig. 1. The pin 83 is in the upper end of slot 82 in link 81, arm 91 and link 92 are depressed so that the foot 93 engages and depresses lever 94 and latch 42, leaving the lower end of lever 40 free to move forward. If now the pull lever 24 is drawn to the left (Fig. 1) to the position indicated by the broken line D, levers 40 and 19 move with the pull lever to effect the instantaneous release of one or both traps, depending upon whether lever 24 is in its central position or has been shifted laterally from its central position. If, however, the pull lever is first shifted to the right (Fig. 1) to the position indicated by the broken line E, the lower end of lever 40 is moved to the left, drawing down the link 81 which, by reason of its engagement with the pin 82, rocks the sleeve 85, elevating link 92 and foot 93 and permitting spring 43 to draw latch 42 into the path of movement of lever 40. The movement of sleeve 85 likewise depresses the free end of lever 88 which, by its engagement with the piston rod head 56, depresses piston 58, compressing spring 61, the oil or other fluid medium flowing upward through the ports 34. This movement of the lever 88 through the pawl 68 likewise rotates ratchet 67 and the sleeve valve 65 an amount equal to the distance between adjacent ports 66. If now the pull lever is drawn to the left to position D, movement of lever 40 and likewise the trap release lever 19 is blocked by engagement of the end of latch 42 with lever 40, and movement of the pull lever compresses the spring 29. The elevation of link 81 incident to the movement of lever 40 has released the assembly on sleeve 85 for counter-clockwise movement by the power of spring 61. Such movement, however, is retarded while the fluid above piston 58 flows through port 64 and one of the ports 66 which is opposite port 64, thence through the valve chest and port 63 into the cylinder 53 below the piston. The time which elapses while the piston is thus elevated obviously depends upon the area of the particular port 66 which is in alignment with port 64. As the piston is elevated, rocking the assembly including sleeve 85 counter-clockwise, link 92 is depressed and, near the end of the upward movement of the piston, foot 93 engages lever 94 and depresses latch 42 out of the path of movement of lever 40. When this lever is released it moves to the right under the power of spring 29, carrying with it the trap releasing lever 19 and thus effecting trap release. Due to the variation in the sizes of the different ports 66, the time between manipulation of the pull lever and trap release varies in each operation.

The form of the invention described and illustrated in the drawings is to be understood as typical and illustrative only, the invention being susceptible to embodiment in many other forms, all falling within the scope of the appended claims, which claims are to be broadly construed.

What is claimed is:

1. A trap releasing timer comprising a manually operable member, a trap releasing member, operative connections between said manually operable member and said trap releasing member comprising a normally ineffective latch rendered effective by said manually operable member, a piston displaced by said manually operable member, and latch displacing means actuated by the return of said piston to normal position.

2. A trap releasing timer comprising a manually operable member, a trap releasing member, operative connections between said manually operable member and said trap releasing member comprising a normally ineffective latch rendered effective by said manually operable member, a piston displaced by said manually operable member, latch displacing means actuated by the return of said piston to normal position, and means for varying the rate of return of said piston to normal position in successive operations thereof.

3. A trap releasing timer comprising a manually operable member, a trap releasing member, operative connections between said manually operable member and said trap releasing member comprising a piston displaced by said manually operable member, fluid means for controlling the return of said piston to normal position, and means for automatically varying the rate of flow of said fluid means in successive operations of the timer.

4. A trap releasing timer comprising a manually operable member, a trap releasing member, operative connections between said manually operable member and said trap releasing member comprising a piston displaced by said manually operable member, a fluid arranged to control the return of said piston by flow through an orifice from one side of said piston to the opposite side thereof, and means for automatically varying the area of said orifice in successive operations of the timer.

5. A trap releasing timer comprising a manually operable member, a trap releasing member, operative connections between said manually operable member and said trap releasing member comprising a piston adapted to be displaced by said manually operable member, means for controlling the return of said piston to normal position comprising a fluid, a passage for conducting said fluid from one side of said piston to the opposite side thereof, a flow controlling valve in said passage comprising a plurality of orifices, and means for presenting successive orifices of said plurality for the passage of said fluid in successive operations of the timer.

6. A trap releasing timer comprising a manually operable member, a trap releasing member, operative connections between said manually operable member and said trap releasing member comprising a piston adapted to be displaced by said manually operable member, means for controlling the return of said piston to normal position comprising a fluid, a passage for conducting said fluid from one side of said piston to the opposite side thereof, a sleeve valve in said passage comprising a plurality of orifices, and means for rotating said sleeve valve to utilize a different orifice in each operation of the timer.

7. A trap releasing timer comprising a manually operable member, a trap releasing member, operative connections between said manually operable member and said trap releasing member comprising a piston adapted to be displaced by said manually operable member, means for controlling the return of said piston to normal position comprising a fluid, a passage for conducting said fluid from one side of said piston to the opposite side thereof, a sleeve valve in said passage comprising a plurality of orifices, and means actuated by said manually operable member for rotating said sleeve valve to utilize a different orifice in each operation of the timer.

8. A trap releasing timer comprising a manually operable member, a trap releasing member, operative connections between said manually operable member and said trap releasing member comprising a piston adapted to be displaced by said manually operable member, means for controlling the return of said piston to normal position comprising a fluid, a passage for conducting said fluid from one side of said piston to the opposite side thereof, a sleeve valve in said passage comprising a plurality of orifices, and means for rotating said sleeve valve to utilize a different orifice in each operation of the timer, said means comprising a pawl and ratchet connection to said sleeve valve actuated by said manually operable member.

9. A trap releasing timer comprising a manually operable member, a trap releasing member, operative connections between said manually operable member and said trap releasing member comprising a piston adapted to be displaced by said manually operable member, said piston being housed in a cylinder, a valve chest associated with said cylinder, a passage through said valve chest for conducting fluid from one side of said piston to the opposite side thereof through orifices connecting said valve chest with said cylinder, a valve in said valve chest provided with a plurality of orifices of varying area adapted for successive alignment with one of said communicating orifices in successive operations of the timer.

10. A trap releasing timer comprising a manually operable member, a trap releasing member, operative connections between said manually operable member and said trap releasing member comprising a piston adapted to be displaced by said manually operable member, said piston being housed in a cylinder, a valve chest associated with said cylinder, a passage through said valve chest for conducting fluid from one side of said piston to the opposite side thereof through orifices connecting said valve chest with said cylinder, a sleeve valve in said valve chest provided with a plurality of orifices of varying area adapted for alignment with one of said communicating orifices, and means actuated by said manually operable member for shifting said sleeve valve to so align a different orifice therein in successive operations of the timer.

11. Apparatus for effecting the delayed release of a target trap comprising, in combination, a frame, pivot means associated with said frame, an operating handle supported on said pivot means, said operating handle normally occupying an intermediate neutral position and being movable therefrom in one direction to a trap releasing position and in another direction to a cocking position, a trap releasing lever, connections from said handle to said trap reelasing lever including a compressible resilient means and a lever adapted to be engaged by a latch, said resilient means being effective upon movement of said handle from neutral to trap releasing position to directly actuate said trap releasing lever, a normally ineffective latch for said lever, means for rendering said latch effective upon a preliminary movement of said operating handle from neutral position to cocking position, a timing device energized by said movement of said operating handle from neutral position to cocking position, and means controlled by said timing device for disabling said latch a predetermined time after said operating handle has been moved from cocking position to trap releasing position.

12. Apparatus for effecting the delayed release of a target trap comprising, in combination, a frame, pivot means associated with said frame, an operating handle supported on said pivot means, said operating handle normally occupying an intermediate neutral position and being movable therefrom in one direction to a trap releasing position and in another direction to a cocking position, a trap releasing lever, connections from said handle to said trap releasing lever including a compressible resilient means and a lever adapted to be engaged by a latch, said resilient means being effective upon movement of said handle from neutral to trap releasing position to directly actuate said trap releasing lever, a normally ineffective latch for said lever, means for rendering said latch effective upon a preliminary movement of said operating handle from neutral position to cocking position, a hydraulic timing device energized by said movement of said operating handle from neutral position to cocking position, and means controlled by said timing device for disabling said latch a predetermined time after said operating handle has been moved from cocking position to trap releasing position.

13. Apparatus for effecting the delayed release of a target trap comprising, in combination, a frame, pivot means associated with said frame, an operating handle supported on said pivot means, said operating handle normally occupying an intermediate neutral position and being movable therefrom in one direction to a trap releasing position and in another direction to a cocking position, a trap releasing lever, connections from said handle to said trap releasing lever including a compressible resilient means and a lever adapted to be engaged by a latch, said resilient means being effective upon movement of said handle from neutral to trap releasing position to directly actuate said trap releasing lever, a normally ineffective latch for said lever, means for rendering said latch effective upon a preliminary movement of said operating handle from neutral position to cocking position, an automatically variable hydraulic timing device energized by said movement of said operating handle from neutral position to cocking position, and means controlled by said timing device for disabling said latch a predetermined time after said operating handle has been moved from cocking position to trap releasing position.

14. Apparatus for effecting delayed release of a target trap comprising, in combination, a frame, pivot means associated with said frame, an operating handle supported on said means, said operating handle normally occupying an intermediate neutral position and being movable therefrom in one direction to a trap releasing position and in another direction to a cocking position, a trap releasing lever, connections from said handle to said trap releasing lever including a compressible spring having one end operatively connected to the handle, the other end thereof being connected to an intermediate lever, said last mentioned lever being adapted to be engaged by said latch, said spring means being operable upon movement of said handle from neutral to trap releasing position to directly actuate said trap releasing lever, means for rendering said latch effective upon a preliminary movement of said operating handle from neutral position to cocking position, a timing device energized by said movement of the operating handle from neutral position to cocking position, and means controlled by said timing device for disabling said latch a predetermined time after said operating handle has been moved from cocking position to trap releasing position, said latch preventing movement of the intermediate lever so that the spring is compressed upon movement of the operating handle to releasing position until the latch is disabled, said spring then moving the intermediate lever to operate the trap release lever.

CRAWFORD C. LOOMIS.